United States Patent
Ingram et al.

(10) Patent No.: US 10,493,398 B2
(45) Date of Patent: Dec. 3, 2019

(54) CYCLIC AMINE FOR SELECTIVELY REMOVING HYDROGEN SULPHIDE

(71) Applicant: BASF SE, Ludwigshafen am Rhein (DE)

(72) Inventors: Thomas Ingram, Ludwigshafen (DE); Georg Sieder, Ludwigshafen (DE); Torsten Katz, Ludwigshafen (DE); Gerald Vorberg, Ludwigshafen (DE); Ralf Notz, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 15/764,138

(22) PCT Filed: Sep. 7, 2016

(86) PCT No.: PCT/EP2016/071073
§ 371 (c)(1),
(2) Date: Mar. 28, 2018

(87) PCT Pub. No.: WO2017/055040
PCT Pub. Date: Apr. 6, 2017

(65) Prior Publication Data
US 2018/0272271 A1  Sep. 27, 2018

(30) Foreign Application Priority Data
Sep. 29, 2015  (EP) .................... 15187385

(51) Int. Cl.
*B01D 53/52* (2006.01)
*B01D 53/14* (2006.01)
(Continued)

(52) U.S. Cl.
CPC ..... *B01D 53/1493* (2013.01); *B01D 53/1468* (2013.01); *C10L 3/102* (2013.01);
(Continued)

(58) Field of Classification Search
None
See application file for complete search history.

(56) References Cited

U.S. PATENT DOCUMENTS

| | | |
|---|---|---|
| 4,537,753 A | 8/1985 | Wagner et al. |
| 4,551,158 A | 11/1985 | Wagner et al. |

(Continued)

FOREIGN PATENT DOCUMENTS

| | | |
|---|---|---|
| CA | 1290553 C | 10/1991 |
| CA | 1295810 C | 2/1992 |

(Continued)

OTHER PUBLICATIONS

International Search Report dated Nov. 22, 2016 in PCT/EP2016/071073, (with English translation), citing documents AA-AC, AO and AP therein, 5 pages.

(Continued)

*Primary Examiner* — Daniel Berns
(74) *Attorney, Agent, or Firm* — Oblon, McClelland, Maier & Neustadt, L.L.P.

(57) ABSTRACT

The use of an amine of the formula (I)

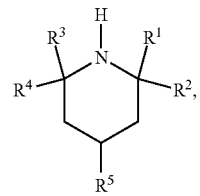

in which the $R^1$ to $R^5$ radicals are each as defined in the description, and an absorbent and a process for removing (Continued)

acidic gases from a fluid stream, especially for selectively removing hydrogen sulfide over carbon dioxide. The invention also relates to particular amines suitable for selective removal of hydrogen sulfide. Absorbents based on amines of the formula (I) have high selectivity, high loading capacity and good regeneration capacity.

8 Claims, 2 Drawing Sheets

(51) Int. Cl.
    *B01D 53/78* (2006.01)
    *B01D 53/96* (2006.01)
    *C10L 3/10* (2006.01)

(52) U.S. Cl.
    CPC ............... *C10L 3/103* (2013.01); *C10L 3/104* (2013.01); *B01D 2252/20431* (2013.01); *B01D 2252/20436* (2013.01); *B01D 2252/20442* (2013.01); *B01D 2252/20478* (2013.01); *B01D 2252/20489* (2013.01); *B01D 2252/504* (2013.01); *B01D 2256/245* (2013.01); *C10L 2290/541* (2013.01); *C10L 2290/542* (2013.01)

(56) References Cited

U.S. PATENT DOCUMENTS

| | | | |
|---|---|---|---|
| 4,553,984 | A | 11/1985 | Volkamer et al. |
| 4,997,630 | A | 3/1991 | Wagner et al. |
| 4,999,031 | A | 3/1991 | Gerhardt et al. |
| 6,436,174 | B1 | 8/2002 | Grossmann et al. |
| 2013/0118350 | A1 | 5/2013 | Rolker et al. |
| 2013/0247758 | A1 | 9/2013 | Seiler et al. |
| 2013/0263743 | A1 | 10/2013 | Seiler et al. |
| 2013/0306954 | A1* | 11/2013 | Hayashi ................ H01L 51/004 257/40 |
| 2014/0079613 | A1 | 3/2014 | Andarcia et al. |
| 2014/0090558 | A1 | 4/2014 | Rolker et al. |
| 2014/0105801 | A1 | 4/2014 | Rolker et al. |
| 2014/0120016 | A1 | 5/2014 | Rolker et al. |
| 2015/0125373 | A1 | 5/2015 | Willy et al. |
| 2016/0045857 | A1 | 2/2016 | Rolker et al. |

FOREIGN PATENT DOCUMENTS

| | | |
|---|---|---|
| DE | 10 2005 043 142 A1 | 4/2006 |
| EP | 0 121 109 A2 | 10/1984 |
| EP | 0 159 495 A2 | 10/1985 |
| EP | 0 190 434 A2 | 8/1986 |
| EP | 0 202 600 A2 | 11/1986 |
| EP | 0 359 991 A1 | 3/1990 |
| WO | WO 00/00271 A1 | 1/2000 |
| WO | WO 2010/089257 A1 | 8/2010 |
| WO | WO 2012/062830 A1 | 5/2012 |
| WO | WO 2012/168067 A1 | 12/2012 |
| WO | WO 2012/168094 A1 | 12/2012 |
| WO | WO 2012/168095 A1 | 12/2012 |
| WO | WO 2013/167367 A1 | 11/2013 |

OTHER PUBLICATIONS

International Preliminary Report on Patentability dated Jan. 16, 2018 in PCT/EP2016/071073 filed Sep. 7, 2016 (with English translation), 25 pages.
U.S. Appl. No. 15/506,451, filed Feb. 24, 2017, Vorberg et al.
U.S. Appl. No. 15/506,472, filed Feb. 24, 2017, Ingram et al.
U.S. Appl. No. 15/506,635, filed Feb. 24, 2017, U.S. Pat. No. 2017/0282115, Ingram et al.
U.S. Appl. No. 15/506,646, filed Feb. 24, 2017, U.S. Pat. No. 2017/0282116, Ingram et al.
U.S. Appl. No. 15/760,257, filed Mar. 15, 2018, Ingram et al.
U.S. Appl. No. 15/763,604, filed Mar. 27, 2018, Vorberg et al.
U.S. Appl. No. 15/763,981, filed Mar. 28, 2018, Ingram et al.
U.S. Appl. No. 15/764,142, filed Mar. 28, 2018, Ingram et al.

* cited by examiner

CYCLIC AMINE FOR SELECTIVELY REMOVING HYDROGEN SULPHIDE

The present invention relates to the use of cyclic amines for removal of acidic gases from fluid streams, especially for selective removal of hydrogen sulfide, and to an absorbent and a process for removing acidic gases from a fluid stream, especially for selective removal of hydrogen sulfide over carbon dioxide. The invention also relates to particular amines suitable for selective removal of hydrogen sulfide, which are novel substances.

The removal of acid gases, for example $CO_2$, $H_2S$, $SO_2$, $CS_2$, HCN, COS or mercaptans, from fluid streams such as natural gas, refinery gas or synthesis gas is important for various reasons. The content of sulfur compounds in natural gas has to be reduced directly at the natural gas source through suitable treatment measures, since the sulfur compounds form acids having corrosive action in the water frequently entrained by the natural gas. For the transport of the natural gas in a pipeline or further processing in a natural gas liquefaction plant (LNG=liquefied natural gas), given limits for the sulfur-containing impurities therefore have to be observed. In addition, numerous sulfur compounds are malodorous and toxic even at low concentrations.

Carbon dioxide has to be removed from natural gas among other substances, because a high concentration of $CO_2$ in the case of use as pipeline gas or sales gas reduces the calorific value of the gas. Moreover, $CO_2$ in conjunction with moisture, which is frequently entrained in the fluid streams, can lead to corrosion in pipes and valves. Too low a concentration of $CO_2$, in contrast, is likewise undesirable since the calorific value of the gas can be too high as a result. Typically, the $CO_2$ concentrations for pipeline gas or sales gas are between 1.5% and 3.5% by volume.

Acid gases are removed by using scrubbing operations with aqueous solutions of inorganic or organic bases. When acid gases are dissolved in the absorbent, ions form with the bases. The absorbent can be regenerated by decompression to a lower pressure and/or by stripping, in which case the ionic species react in reverse to form acid gases and/or are stripped out by means of steam. After the regeneration process, the absorbent can be reused.

A process in which all acid gases, especially $CO_2$ and $H_2S$, are very substantially removed is referred to as "total absorption". In particular cases, in contrast, it may be desirable to preferentially absorb $H_2S$ over $CO_2$, for example in order to obtain a calorific value-optimized $CO_2/H_2S$ ratio for a downstream Claus plant. In this case, reference is made to "selective scrubbing". An unfavorable $CO_2/H_2S$ ratio can impair the performance and efficiency of the Claus plant through formation of $COS/CS_2$ and coking of the Claus catalyst or through too low a calorific value.

The selective removal of hydrogen sulfide is frequently employed in the case of fluid streams having low partial acid gas pressures, for example in tail gas, or in the case of acid gas enrichment (AGE), for example for enrichment of $H_2S$ prior to the Claus process.

In the case of natural gas treatment for pipeline gas too, selective removal of $H_2S$ over $CO_2$ may be desirable. In many cases, the aim in natural gas treatment is simultaneous removal of $H_2S$ and $CO_2$, wherein given $H_2S$ limits have to be observed but complete removal of $CO_2$ is unnecessary. The specification typical of pipeline gas requires acid gas removal to about 1.5% to 3.5% by volume of $CO_2$ and less than 4 ppmv of $H_2S$. In these cases, maximum $H_2S$ selectivity is undesirable.

Highly sterically hindered secondary amines, such as 2-(2-tert-butylaminoethoxy)ethanol (TBAEE), and tertiary amines, such as methyldiethanolamine (MDEA), exhibit kinetic selectivity for $H_2S$ over $CO_2$. These amines do not react directly with $CO_2$; instead, $CO_2$ is reacted in a slow reaction with the amine and with water to give bicarbonate—in contrast, $H_2S$ reacts immediately in aqueous amine solutions. Such amines are therefore especially suitable for selective removal of $H_2S$ from gas mixtures comprising $CO_2$ and $H_2S$.

Particularly absorbents based on MDEA have wide practical use. The $H_2S$ selectivity of an absorbent depends on the partial acid gas pressures and loadings. At low partial acid gas pressures, MDEA, for example, shows poorer $H_2S$ selectivity compared to TBAEE.

Cyclic secondary amines such as piperidine derivatives are also employed in gas scrubbing. WO 2012/062830 A1, WO 2013/167367 A1, WO 2010/089257 A1, WO 2012/168094 A1, WO 2012/168095 A1 and WO 2012/168067 A1 describe aqueous absorption media comprising piperidine derivatives for acid gas absorption from a gas mixture. The selective removal of hydrogen sulfide is not discussed.

US 2014/0079613 A1 describes an aqueous absorption medium comprising a cyclic amine having exclusively tertiary amino groups and a cyclic amine comprising at least one sterically unhindered amino group for acid gas absorption from a gas mixture. DE 10 2005 043 142 A1 describes an aqueous absorbent comprising a polyamine having at least two primary, secondary or tertiary amino groups and an aliphatic or cycloaliphatic amine. These documents do not describe selective $H_2S$ removal either.

It is an object of the invention to provide further amines, absorbents and processes for selective removal of hydrogen sulfide and carbon dioxide from a fluid stream. Absorbents based on the amines should have high selectivity, high loading capacity and good regeneration capacity.

In a first aspect, the invention relates to the use of an amine of the formula (I)

in which
$R^1$, $R^2$, $R^3$ and $R^4$ are independently selected from $C_1$-$C_5$-alkyl and $C_2$-$C_5$-hydroxyalkyl;
$R^5$ is selected from $NR^6R^7$, $O(CR^8R^9)_xNR^6R^7$ and $OR^{10}$;
$R^6$ is selected from hydrogen, $C_1$-$C_5$-alkyl and $C_2$-$C_5$-hydroxyalkyl and $R^7$ is selected from $C_1$-$C_5$-alkyl and $C_2$-$C_5$-hydroxyalkyl, with the proviso that, when $R^6$ is hydrogen, $R^7$ is $C_3$-$C_5$-alkyl bonded to the nitrogen atom via a secondary or tertiary carbon atom;
$R^8$ and $R^9$ are each independently selected from hydrogen and $C_1$-$C_5$-alkyl;
x is an integer from 2 to 5; and
$R^{10}$ is selected from hydrogen, $C_1$-$C_5$-alkyl and $C_2$-$C_5$-hydroxyalkyl;
for selective removal of hydrogen sulfide from a fluid stream comprising carbon dioxide and hydrogen sulfide.

In a further aspect, the invention relates to a process for selectively removing hydrogen sulfide from a fluid stream comprising carbon dioxide and hydrogen sulfide, in which the fluid stream is contacted with an absorbent comprising an amine of the above formula (I) to obtain a treated fluid stream and a laden absorbent.

In a further aspect, the invention also relates to an absorbent for selective removal of hydrogen sulfide from a fluid stream comprising carbon dioxide and hydrogen sulfide, comprising
a) an amine of the formula (Ia)

(Ia)

in which
$R^1$, $R^2$, $R^3$ and $R^4$ are independently selected from $C_1$-$C_5$-alkyl and $C_2$-$C_5$-hydroxyalkyl;
$R^5$ is selected from $NR^6R^7$, $O(CR^8R^9)_xNR^{6'}R^{7'}$ and $OR^{10}$;
$R^6$ is hydrogen;
$R^7$ is $C_3$-$C_5$-alkyl bonded to the nitrogen atom via a secondary or tertiary carbon atom;
$R^{6'}$ is selected from hydrogen, $C_1$-$C_5$-alkyl and $C_2$-$C_5$-hydroxyalkyl and $R^{7'}$ is selected from $C_1$-$C_5$-alkyl and $C_2$-$C_5$-hydroxyalkyl, with the proviso that, when $R^{6'}$ is hydrogen, $R^{7'}$ is $C_3$-$C_5$-alkyl bonded to the nitrogen atom via a secondary or tertiary carbon atom;
$R^8$ and $R^9$ are each independently selected from hydrogen and $C_1$-$C_5$-alkyl;
x is an integer from 2 to 5; and
$R^{10}$ is selected from hydrogen, $C_1$-$C_5$-alkyl and $C_2$-$C_5$-hydroxyalkyl; and
b) a tertiary amine and/or a highly sterically hindered amine.

Preferably, the amine a) is 4-hydroxy-2,2,6,6-tetramethylpiperidine. Preferably, the amine b) is selected from methyldiethanolamine (MDEA) and 2-(2-tert-butylaminoethoxy)ethanol (TBAEE).

In a further aspect, the invention also relates to an amine of the formula (Ib)

(Ib)

in which
$R^1$, $R^2$, $R^3$ and $R^4$ are independently selected from $C_1$-$C_5$-alkyl and $C_2$-$C_5$-hydroxyalkyl;
$R^5$ is selected from $NR^6R^7$ and $O(CR^8R^6)_xNR^6R^7$;
$R^6$ is hydrogen;
$R^7$ is $C_3$-$C_5$-alkyl bonded to the nitrogen atom via a secondary or tertiary carbon atom;
$R^8$ and $R^9$ are each independently selected from hydrogen and $C_1$-$C_5$-alkyl; and
x is an integer from 2 to 5.

In a further aspect, the invention relates to an absorbent for selective removal of hydrogen sulfide from a fluid stream comprising carbon dioxide and hydrogen sulfide, comprising at least one amine of the above formula (Ib).

Unless the opposite is clear from the context, the details which follow apply to the inventive use, the inventive absorbents, the process of the invention and the inventive amine.

$R^1$, $R^2$, $R^3$ and $R^4$ are independently selected from $C_1$-$C_5$-alkyl and $C_2$-$C_5$-hydroxyalkyl. Preferably, $R^1$, $R^2$, $R^3$ and $R^4$ are the same and are methyl.

$C_1$-$C_5$-Alkyl is preferably methyl or ethyl; $C_2$-$C_5$-hydroxyalkyl is preferably 2-hydroxyethyl; $C_3$-$C_5$-alkyl bonded to a nitrogen atom via a secondary or tertiary carbon atom is preferably isopropyl (2-propyl) or tert-butyl (2-methyl-2-propyl).

$R^8$ and $R^9$ are preferably hydrogen.

The symbol x is an integer from 2 to 5, preferably 2 to 4, more preferably 2 to 3 and most preferably 2.

The amines of the formula (I) have high thermal and chemical stability. The substituent $R^5$ affects both the degree of $H_2S$ selectivity and the water solubility. Thus, by means of suitable choice of the substituent $R^5$, it is possible to choose an optimal absorbent for the particular separating task for removal of hydrogen sulfide from a fluid stream.

The amines of the general formula (I) are compounds comprising a sterically hindered secondary amino group and optionally one or more tertiary amino groups and/or further sterically hindered secondary amino groups. Compounds of this kind can deprotonate hydrogen sulfide and form ionic products. The compounds do not react directly with $CO_2$, but react merely in a gradual transprotonation in the presence of a proton donor such as water. This achieves kinetic selectivity of the removal of $H_2S$ compared to $CO_2$.

The secondary ring nitrogen atom in the amine of the formula (I) is sterically hindered because of the $R^1$, $R^2$, $R^3$ and $R^4$ radicals on the directly adjacent carbon atoms. If the amine comprises further secondary amino groups, these are sterically hindered because of their substituents. Steric hindrance of a secondary amino group is understood to mean the presence of at least one acyclic secondary or tertiary carbon atom directly adjacent to the nitrogen atom of the amino group.

A secondary carbon atom is understood to mean a carbon atom which, apart from the bond to the sterically hindered position, has two carbon-carbon bonds. A tertiary carbon atom is understood to mean a carbon atom which, apart from the bond to the sterically hindered position, has three carbon-carbon bonds. A secondary amine is understood to mean a compound having a nitrogen atom substituted by two organic radicals other than hydrogen.

In one embodiment, $R^5$ is $NR^6R^7$ or $O(CR^8R^9)_xNR^6R^7$; in which $R^6$ is selected from hydrogen and $C_1$-$C_5$-alkyl and $R^7$ is $C_1$-$C_5$-alkyl, with the proviso that, when $R^6$ is hydrogen, $R^7$ is $C_3$-$C_5$-alkyl bonded to the nitrogen atom via a secondary or tertiary carbon atom; $R^8$ and $R^9$ are each independently selected from hydrogen and $C_1$-$C_5$-alkyl; and x is an integer from 2 to 4. Illustrative representatives are:
4-(N,N-dimethylamino)-2,2,6,6-tetramethylpiperidine,
4-(N,N-diethylamino)-2,2,6,6-tetramethylpiperidine,
4-(N,N-di-(3'-hydroxypropyl)amino)-2,2,6,6-tetramethylpiperidine,
4-(N,N-di-(4'-hydroxybutyl)amino)-2,2,6,6-tetramethylpiperidine,
4-(3'-(N,N-dimethylamino)propoxy)-2,2,6,6-tetramethylpiperidine, 4-(4'-(N,N-dimethylamino)butoxy)-2,2,6,6-tetramethylpiperidine,
4-isopropylamino-2,2,6,6-tetramethylpiperidine,
4-(tert-butylamino)-2,2,6,6-tetramethylpiperidine,
4-(2-(isopropylamino)ethoxy)-2,2,6,6-tetramethylpiperidine,
4-(2-(tert-butylamino)ethoxy)-2,2,6,6-tetramethylpiperidine and
4-(di-(2-hydroxyethyl)amino)-2,2,6,6-tetramethylpiperidine.

In one embodiment, $R^5$ is $OR^{10}$. Illustrative representatives are:
4-hydroxy-2,2,6,6-tetramethylpiperidine (TAAol),
4-ethoxy-2,2,6,6-tetramethylpiperidine,
4-propoxy-2,2,6,6-tetramethylpiperidine,
4-butoxy-2,2,6,6-tetramethylpiperidine,
4-(2'-hydroxyethoxy)-2,2,6,6-tetramethylpiperidine,
4-(3'-hydroxypropoxy)-2,2,6,6-tetramethylpiperidine and
4-(4'-hydroxybutoxy)-2,2,6,6-tetramethylpiperidine.

Most preferred are 4-(N,N-dimethylamino)-2,2,6,6-tetramethylpiperidine (DATP), 4-hydroxy-2,2,6,6-tetramethylpiperidine (TAAol), 4-(tert-butylamino)-2,2,6,6-tetramethylpiperidine, 4-(2-(tert-butylamino)ethoxy)-2,2,6,6-tetramethylpiperidine and 4-(d i-(2-hydroxyethyl)amino)-2,2,6,6-tetramethylpiperidine.

Amines of the formula (I) are generally soluble in water to an extent of at least 5% by weight, more preferably at least 10% by weight and most preferably at least 15% by weight.

The amines of the general formula (I) show marked temperature dependence of the $pK_A$. The result of this is that, at relatively low temperatures as exist in the absorption step, the higher $pK_A$ promotes efficient acid gas absorption, whereas, at relatively high temperatures as exist in the desorption step, the lower $pK_A$ supports the release of the absorbed acid gases. It is expected that a great $pK_A$ differential for the amine of the general formula (I) between adsorption and desorption temperature will result in a comparatively small regeneration energy.

The $pK_A$ values are suitably measured in aqueous solution with an amine concentration of 0.01 to 0.05 mol/kg at the specified temperature by determining the pH at the half-equivalence point, as shown, for example, by the working examples.

In one embodiment, the amine of the formula (I) is used in combination with a tertiary amine and/or highly sterically hindered amine, or the absorbent comprises, as well as the amine of the formula (I), a tertiary amine or highly sterically hindered amine. The tertiary amine or the highly sterically hindered amine is different than the amine of the formula (I). High steric hindrance is understood to mean a tertiary carbon atom directly adjacent to a primary or secondary nitrogen atom.

In general, the concentration of the amine of the formula (I) in the aqueous solution is 10% to 60% by weight, preferably 20% to 50% by weight, more preferably 30% to 50% by weight. If the absorbent also comprises, as well as the amine of the formula (I), an amine other than the amine of the formula (I), the total concentration of the amines in the aqueous solution is preferably 10% to 60% by weight, more preferably 20% to 50% by weight, most preferably 30% to 50% by weight.

The molar ratio of amine of the general formula (I) to the amine other than the amine of the formula (I) is preferably in the range from 0.05 to 1.0, preferably 0.1 to 0.9.

The suitable tertiary amines other than the amines of the general formula (I) especially include:
1. Tertiary alkanolamines such as bis(2-hydroxyethyl)methylamine (methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA);
2. Tertiary amino ethers such as 3-methoxypropyldimethylamine;
3. Tertiary polyamines, for example bis-tertiary diamines such as
N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N,N',N'-tetramethyl-1,6-hexanediamine, N,N-dimethyl-N',N'-diethylethylenediamine (DMDEEDA), 1-dimethylamino-2-dimethylaminoethoxyethane (bis[2-(dimethylamino)ethyl] ether), 1,4-diazabicyclo[2.2.2]octane (TEDA), tetramethyl-1,6-hexanediamine;
and mixtures thereof.

Tertiary alkanolamines, i.e. amines having at least one hydroxyalkyl group bonded to the nitrogen atom, are generally preferred. Particular preference is given to methyldiethanolamine (MDEA).

The suitable highly sterically hindered amines (i.e. amines having a tertiary carbon atom directly adjacent to a primary or secondary nitrogen atom) other than the amines of the general formula (I) especially include:
1. Highly sterically hindered secondary alkanolamines such as
2-(2-tert-butylaminoethoxy)ethanol (TBAEE), 2-(2-tert-butylamino)propoxyethanol, 2-(2-tert-amylaminoethoxy)ethanol, 2-(2-(1-methyl-1-ethylpropylamino)ethoxy)ethanol, 2-(tert-butylamino)ethanol, 2-tert-butylamino-1-propanol, 3-tert-butylamino-1-propanol, 3-tert-butylamino-1-butanol, and 3-aza-2,2-dimethylhexane-1,6-diol;
2. Highly sterically hindered primary alkanolamines such as 2-amino-2-methylpropanol (2-AMP); 2-amino-2-ethylpropanol; and 2-amino-2-propylpropanol;
3. Highly sterically hindered amino ethers such as 1,2-bis(tert-butylaminoethoxy)ethane, bis(tert-butylaminoethyl) ether;
and mixtures thereof.

Highly sterically hindered secondary alkanolamines are generally preferred. Particular preference is given to 2-(2-tert-butylaminoethoxy)ethanol (TBAEE).

Preferably, the absorbent does not comprise any sterically unhindered primary amine or sterically unhindered secondary amine. Compounds of this kind act as strong activators of $CO_2$ absorption. As a result, the $H_2S$ selectivity of the absorbent can be lost.

A sterically unhindered primary amine is understood to mean compounds having primary amino groups to which only hydrogen atoms or primary or secondary carbon atoms are bonded. A sterically unhindered secondary amine is understood to mean compounds having secondary amino groups to which only hydrogen atoms or primary carbon atoms are bonded.

In a preferred embodiment, the absorbent is an aqueous solution.

In one embodiment, the absorbent comprises at least one organic solvent. It may be desirable to limit the water content of the absorbent, for example to a maximum of 40% by weight or a maximum of 30% by weight or a maximum of 20% by weight or a maximum of 10% by weight or a maximum of 5% by weight, based on the weight of the absorbent.

The organic solvent is preferably selected from:
$C_4$-$C_{10}$ alcohols such as n-butanol, n-pentanol and n-hexanol;
ketones such as cyclohexanone;
esters such as ethyl acetate and butyl acetate;
lactones such as γ-butyrolactone, δ-valerolactone and ε-caprolactone;
amides such as tertiary carboxamides, for example N,N-dimethylformamide; or N-formylmorpholine and N-acetyl-morpholine;
lactams such as γ-butyrolactam, δ-valerolactam and ε-caprolactam and N-methyl-2-pyrrolidone (NMP);
sulfones such as sulfolane;
sulfoxides such as dimethyl sulfoxide (DMSO);
diols, for example glycols such as ethylene glycol (EG) and propylene glycol;
polyalkylene glycols such as diethylene glycol (DEG) and triethylene glycol (TEG);
di- or mono($C_{1-4}$-alkyl ether) glycols such as ethylene glycol dimethyl ether;
di- or mono($C_{1-4}$-alkyl ether) polyalkylene glycols such as diethylene glycol dimethyl ether, dipropylene glycol monomethyl ether and triethylene glycol dimethyl ether;
cyclic ureas such as N,N-dimethylimidazolidin-2-one and dimethylpropyleneurea (DMPU);
thioalkanols such as ethylenedithioethanol, thiodiethylene glycol (thiodiglycol, TDG) and methylthioethanol;
and mixtures thereof.

More preferably, the organic solvent is selected from sulfones, diols, di- or mono($C_{1-4}$-alkyl ether) polyalkylene glycols and polyalkylene glycols. Most preferably, the organic solvent is selected from sulfones. A preferred organic solvent is sulfolane.

In one embodiment, the amine of the formula (I) is used in combination with an acid having a $pK_A$ of less than 6, especially less than 5, or the absorbent comprises at least one acid having a $pK_A$ of less than 6, especially less than 5. In the case of acids having more than one dissociation stage and accordingly more than one $pK_A$, this requirement is met where one of the $pK_A$ values is within the range specified. The acid is suitably selected from protic acids (Brønsted acids).

The acid is preferably added in such an amount that the pH of the aqueous solution measured at 120° C. is 7.9 to less than 8.8, preferably 8.0 to less than 8.8, more preferably 8.0 to less than 8.5, most preferably 8.0 to less than 8.2.

A protonation equilibrium forms between the acid and the amine of the general formula (I). The position of the equilibrium is temperature-dependent, and the equilibrium is shifted at higher temperatures toward the free oxonium ion and/or the amine salt having the lower enthalpy of protonation. It is expected that a great $pK_A$ differential for the amine of the general formula (I) between the absorption and desorption temperature together with the adjustment of the pH by means of acid addition will result in a particularly low regeneration energy.

The acid is selected from organic and inorganic acids. Suitable organic acids comprise, for example, phosphonic acids, sulfonic acids, carboxylic acids and amino acids. In particular embodiments, the acid is a polybasic acid.

Suitable acids are, for example,
mineral acids such as hydrochloric acid, sulfuric acid, amidosulfuric acid, phosphoric acid, partial esters of phosphoric acid, for example mono- and dialkyl phosphates and mono- and diaryl phosphates such as tridecyl phosphate, dibutyl phosphate, diphenyl phosphate and bis(2-ethylhexyl) phosphate; boric acid;
carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethylhexanoic acid, pelargonic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positionally isomeric toluic acids, methoxybenzoic acids, chlorobenzoic acids, nitrobenzoic acids, phthalic acid, terephthalic acid, isophthalic acid; technical carboxylic acid mixtures, for example Versatic acids;
sulfonic acids such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, trifluoromethyl- or nonafluoron-butylsulfonic acid, camphorsulfonic acid, 2-(4-(2-hydroxyethyl)-1-piperazinyl)ethanesulfonic acid (HEPES);
organic phosphonic acids, for example phosphonic acids of the formula (II)

$$R^{11}\text{—}PO_3H \qquad (II)$$

in which $R^{11}$ is $C_1$-$C_{18}$-alkyl optionally substituted by up to four substituents independently selected from carboxyl, carboxamido, hydroxyl and amino.

These include alkylphosphonic acids such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids such as hydroxymethylphosphonic acid, 1-hydroxyethylphosphonic acid, 2-hydroxyethylphosphonic acid; arylphosphonic acids such as phenylphosphonic acid, tolylphosphonic acid, xylylphosphonic acid, aminoalkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid;

phosphonic acids of the formula (III)

(III)

in which $R^{12}$ is H or $C_1$-$C_6$-alkyl, Q is H, OH or $TL_2$ and T is H or $CH_2PO_3H_2$, such as 1-hydroxyethane-1,1-diphosphonic acid;
phosphonic acids of the formula (IV)

(IV)

in which Z is $C_2$-$C_6$-alkylene, cycloalkanediyl, phenylene, or $C_2$-$C_6$-alkylene interrupted by cycloalkanediyl or phenylene, L is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid);
phosphonic acids of the formula (V)

(V)

in which $R^{13}$ is $C_1$-$C_6$-alkyl, $C_2$-$C_6$-hydroxyalkyl or A, and A is $CH_2PO_3H_2$, such as nitrilotris(methylenephosphonic acid) and 2-hydroxyethyliminobis(methylenephosphonic acid);
aminocarboxylic acids having tertiary amino groups or amino groups having at least one secondary or tertiary carbon atom immediately adjacent to the amino group, such as
α-amino acids having tertiary amino groups or amino groups having at least one secondary or tertiary carbon atom immediately adjacent to the amino group, such as N,N-dimethylglycine (dimethylaminoacetic acid), N,N-diethylglycine, alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (1-amino-2-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, N-methylserine, N,N-dimethylserine, 2-(methylamino)isobutyric acid, piperidine-2-carboxylic acid, N-methylpiperidine-2-carboxylic acid,
β-amino acids having tertiary amino groups or amino groups having at least one secondary or tertiary carbon atom immediately adjacent to the amino group, such as 3-dimethylaminopropionic acid, N-methyliminodipropionic acid, N-methylpiperidine-3-carboxylic acid,
γ-amino acids having tertiary amino groups or amino groups having at least one secondary or tertiary carbon atom immediately adjacent to the amino group, such as 4-dimethylaminobutyric acid,
or aminocarboxylic acids having tertiary amino groups or amino groups having at least one secondary or tertiary carbon atom immediately adjacent to the amino group, such as N-methylpiperidine-4-carboxylic acid.

Among the inorganic acids, preference is given to phosphoric acid and sulfuric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4-tricarboxylic acid, 1-hydroxyethane-1,1-diphosphonic acid, ethylenediaminetetra(methylenephosphonic acid), diethylenetriaminepenta(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

Among the aminocarboxylic acids having tertiary amino groups or amino groups having at least one secondary or tertiary carbon atom immediately adjacent to the amino group, preference is given to N,N-dimethylglycine and N-methylalanine.

More preferably, the acid is an inorganic acid.

The absorbent may also comprise additives such as corrosion inhibitors, enzymes, etc. In general, the amount of such additives is in the range from about 0.01% to 3.0% by weight of the absorbent.

Solutions of the amine of the formula (I) or the absorbents preferably have an $H_2S$:$CO_2$ loading capacity ratio of at least 1, more preferably at least 1.2, even more preferably at least 2 and most preferably at least 3.

$H_2S$:$CO_2$ loading capacity ratio is understood to mean the quotient of maximum $H_2S$ loading divided by the maximum $CO_2$ loading under equilibrium conditions in the case of loading of the absorbent with $CO_2$ and $H_2S$ at 40° C. and ambient pressure (about 1 bar). Suitable test methods are specified in the working examples. The $H_2S$:$CO_2$ loading capacity ratio serves as an indication of the expected $H_2S$ selectivity; the higher the $H_2S$:$CO_2$ loading capacity ratio, the higher the expected $H_2S$ selectivity.

In a preferred embodiment, the maximum $H_2S$ loading capacity of the solutions of the amines of the formula (I) or of the absorbent, as measured in the working examples, is at least 5 m³ (STP)/t, more preferably at least 15 m³ (STP)/t, even more preferably at least 25 m³ (STP)/t and most preferably at least 40 m³ (STP)/t.

The process according to the invention is suitable for treatment of all kinds of fluids. Fluids are firstly gases such as natural gas, synthesis gas, coke oven gas, cracking gas, coal gasification gas, cycle gas, landfill gases and combustion gases, and secondly fluids that are essentially immiscible with the absorbent, such as LPG (liquefied petroleum gas) or NGL (natural gas liquids). The process according to the invention is particularly suitable for treatment of hydrocarbonaceous fluid streams. The hydrocarbons present are, for example, aliphatic hydrocarbons such as $C_1$-$C_4$ hydrocarbons such as methane, unsaturated hydrocarbons such as ethylene or propylene, or aromatic hydrocarbons such as benzene, toluene or xylene.

The absorbent or process according to the invention is suitable for removal of $CO_2$ and $H_2S$. As well as carbon dioxide and hydrogen sulfide, it is possible for other acidic gases to be present in the fluid stream, such as COS and mercaptans. In addition, it is also possible to remove $SO_3$, $SO_2$, $CS_2$ and HCN.

The process according to the invention is suitable for selective removal of hydrogen sulfide over $CO_2$. In the present context, "selectivity for hydrogen sulfide" is understood to mean the value of the following quotient:

$$\frac{\frac{mol(H_2S)}{mol(CO_2)} \text{ in the liquid phase}}{\frac{mol(H_2S)}{mol(CO_2)} \text{ in the gas phase}}.$$

In a standard gas scrubbing process, the liquid phase is the laden absorbent at the bottom of the absorber and the gas phase is the fluid stream to be treated.

A gas scrubbing process is considered to be selective when the selectivity is greater than 1. The selectivity for hydrogen sulfide is preferably at least 1.3, more preferably at least 2, even more preferably at least 3. The reported selectivity values are especially also established at acid gas loadings (mol($CO_2$+$H_2S$)/mol(amine)) of 0.2 or higher or 0.4 or higher.

In some cases, for example in the case of removal of acid gases from natural gas for use as pipeline gas or sales gas, total absorption of carbon dioxide is undesirable. In one embodiment, the residual carbon dioxide content in the treated fluid stream is at least 0.5% by volume, preferably at least 1.0% by volume and more preferably at least 1.5% by volume.

In preferred embodiments, the fluid stream is a fluid stream comprising hydrocarbons, especially a natural gas stream. More preferably, the fluid stream comprises more than 1.0% by volume of hydrocarbons, even more preferably more than 5.0% by volume of hydrocarbons, most preferably more than 15% by volume of hydrocarbons.

The partial hydrogen sulfide pressure in the fluid stream is typically at least 2.5 mbar. In preferred embodiments, a partial hydrogen sulfide pressure of at least 0.1 bar, especially at least 1 bar, and a partial carbon dioxide pressure of at least 0.2 bar, especially at least 1 bar, is present in the fluid stream. The partial pressures stated are based on the fluid stream on first contact with the absorbent in the absorption step.

In preferred embodiments, a total pressure of at least 1.0 bar, more preferably at least 3.0 bar, even more preferably at least 5.0 bar and most preferably at least 20 bar is present in the fluid stream. In preferred embodiments, a total pressure of at most 180 bar is present in the fluid stream. The total pressure is based on the fluid stream on first contact with the absorbent in the absorption step.

In the process according to the invention, the fluid stream is contacted with the absorbent in an absorption step in an absorber, as a result of which carbon dioxide and hydrogen sulfide are at least partly scrubbed out. This gives a $CO_2$- and $H_2S$-depleted fluid stream and a $CO_2$- and $H_2S$-laden absorbent.

The absorber used is a scrubbing apparatus used in customary gas scrubbing processes. Suitable scrubbing apparatuses are, for example, random packings, columns having structured packings and having trays, membrane contactors, radial flow scrubbers, jet scrubbers, Venturi scrubbers and rotary spray scrubbers, preferably columns having structured packings, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of packings to reduce pressure drops in the gas flow. There are various designs of structured packings, for example woven packings or sheet metal packings. Materials used may be metal, plastic, glass and ceramic.

The temperature of the absorbent in the absorption step is generally about 30 to 100° C., and when a column is used is, for example, 30 to 70° C. at the top of the column and 50 to 100° C. at the bottom of the column.

The process according to the invention may comprise one or more, especially two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The person skilled in the art can achieve a high level of hydrogen sulfide removal with a defined selectivity by varying the conditions in the absorption step, such as, more particularly, the absorbent/fluid stream ratio, the column height of the absorber, the type of contact-promoting internals in the absorber, such as random packings, trays or structured packings, and/or the residual loading of the regenerated absorbent.

A low absorbent/fluid stream ratio leads to an elevated selectivity; a higher absorbent/fluid stream ratio leads to a less selective absorption. Since $CO_2$ is absorbed more slowly than $H_2S$, more $CO_2$ is absorbed in a longer residence time than in a shorter residence time. A higher column therefore brings about a less selective absorption. Trays or structured packings with relatively high liquid holdup likewise lead to a less selective absorption. The heating energy introduced in the regeneration can be used to adjust the residual loading of the regenerated absorbent. A lower residual loading of regenerated absorbent leads to improved absorption.

The process preferably comprises a regeneration step in which the $CO_2$- and $H_2S$-laden absorbent is regenerated. In the regeneration step, $CO_2$ and $H_2S$ and optionally further acidic gas constituents are released from the $CO_2$- and $H_2S$-laden absorbent to obtain a regenerated absorbent. Preferably, the regenerated absorbent is subsequently recycled into the absorption step. In general, the regeneration step comprises at least one of the measures of heating, decompressing and stripping with an inert fluid.

The regeneration step preferably comprises heating of the absorbent laden with the acidic gas constituents, for example by means of a boiler, natural circulation evaporator, forced circulation evaporator or forced circulation flash evaporator. The absorbed acid gases are stripped out by means of the steam obtained by heating the solution. Rather than steam, it is also possible to use an inert fluid such as nitrogen. The absolute pressure in the desorber is normally 0.1 to 3.5 bar, preferably 1.0 to 2.5 bar. The temperature is normally 50° C. to 170° C., preferably 80° C. to 130° C., the temperature of course being dependent on the pressure.

The regeneration step may alternatively or additionally comprise a decompression. This includes at least one decompression of the laden absorbent from a high pressure as exists in the conduction of the absorption step to a lower pressure. The decompression can be accomplished, for example, by means of a throttle valve and/or a decompression turbine. Regeneration with a decompression stage is described, for example, in publications U.S. Pat. Nos. 4,537,753 and 4,553,984.

The acidic gas constituents can be released in the regeneration step, for example, in a decompression column, for example a flash vessel installed vertically or horizontally, or a countercurrent column with internals.

The regeneration column may likewise be a column having random packings, having structured packings or having trays. The regeneration column, at the bottom, has a heater, for example a forced circulation evaporator with circulation pump. At the top, the regeneration column has an outlet for the acid gases released. Entrained absorbent vapors are condensed in a condenser and recirculated to the column.

It is possible to connect a plurality of decompression columns in series, in which regeneration is effected at different pressures. For example, regeneration can be effected in a preliminary decompression column at a high pressure typically about 1.5 bar above the partial pressure of the acidic gas constituents in the absorption step, and in a main decompression column at a low pressure, for example 1 to 2 bar absolute. Regeneration with two or more decompression stages is described in publications U.S. Pat. No. 4,537,753, 4,553,984, EP 0 159 495, EP 0 202 600, EP 0 190 434 and EP 0 121 109.

Because of the optimal matching of the content of the amine components and of the acid, the absorbent has a high loading capacity with acidic gases, which can also be desorbed again easily. In this way, it is possible to significantly reduce energy consumption and solvent circulation in the process according to the invention.

For a minimum energy requirement in the regeneration of the absorbent, it is advantageous when there is a maximum difference between the pH at the temperature of the absorption and the pH at the temperature of the desorption, since this facilitates the separation of the acid gases from the absorbent.

The invention is illustrated in detail by the appended drawings and the examples which follow.

Figure 1:
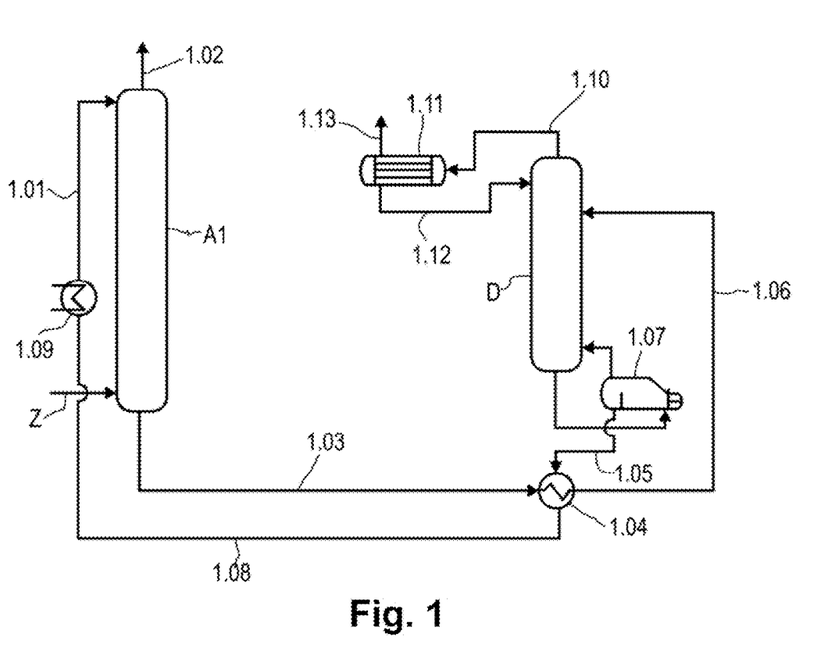
FIG. 1 is a schematic diagram of a plant suitable for performing the process according to the invention.

According to FIG. 1, via the inlet Z, a suitably pretreated gas comprising hydrogen sulfide and carbon dioxide is contacted in countercurrent, in an absorber A1, with regenerated absorbent which is fed in via the absorbent line 1.01. The absorbent removes hydrogen sulfide and carbon dioxide from the gas by absorption; this affords a hydrogen sulfide- and carbon dioxide-depleted clean gas via the offgas line 1.02.

Via the absorbent line 1.03, the heat exchanger 1.04 in which the $CO_2$- and $H_2S$-laden absorbent is heated up with the heat from the regenerated absorbent conducted through the absorbent line 1.05, and the absorbent line 1.06, the $CO_2$- and $H_2S$-laden absorbent is fed to the desorption column D and regenerated.

Between the absorber A1 and heat exchanger 1.04, a flash vessel may be provided (not shown in FIG. 1), in which the $CO_2$- and $H_2S$-laden absorbent is decompressed to, for example, 3 to 15 bar.

From the lower part of the desorption column D, the absorbent is conducted into the boiler 1.07, where it is heated. The mainly water-containing vapor is recycled into the desorption column D, while the regenerated absorbent is fed back to the absorber A1 via the absorbent line 1.05, the heat exchanger 1.04 in which the regenerated absorbent heats up the $CO_2$- and $H_2S$-laden absorbent and at the same time cools down itself, the absorbent line 1.08, the cooler 1.09 and the absorbent line 1.01. Instead of the boiler shown, it is also possible to use other heat exchanger types to generate the stripping vapor, such as a natural circulation evaporator, forced circulation evaporator or forced circulation flash evaporator. In the case of these evaporator types, a mixed-phase stream of regenerated absorbent and stripping vapor is returned to the bottom of the desorption column D, where the phase separation between the vapor and the absorbent takes place. The regenerated absorbent to the heat exchanger 1.04 is either drawn off from the circulation stream from the bottom of the desorption column D to the evaporator or conducted via a separate line directly from the bottom of the desorption column D to the heat exchanger 1.04.

The $CO_2$- and $H_2S$-containing gas released in the desorption column D leaves the desorption column D via the offgas line 1.10. It is conducted into a condenser with integrated phase separation 1.11, where it is separated from entrained absorbent vapor. In this and all the other plants suitable for performance of the process according to the invention, condensation and phase separation may also be present separately from one another. Subsequently, a liquid consisting mainly of water is conducted through the absorbent line 1.12 into the upper region of the desorption column D, and a $CO_2$- and $H_2S$-containing gas is discharged via the gas line 1.13.

EXAMPLES

The following abbreviations were used:
Butyl-TAD: 4-butylamino-2,2,6,6-tetramethylpiperidine
DATP: 4-dimethylamino-2,2,6,6-tetramethylpiperidine
MDEA: methyldiethanolamine
TAAol: 4-hydroxy-2,2,6,6-tetramethylpiperidine
TAD: 4-amino-2,2,6,6-tetramethylpiperidine
TBATP: 4-(tert-butylamino)-2,2,6,6-tetramethylpiperidine
Figures in percent are generally % by weight.

Example 1—$pK_A$ Values

The $pK_A$ values of various amines were determined by means of the half-equivalence method. For this purpose, the amines were dissolved in water with a concentration of 0.01 to 0.5 mol/L and partly neutralized with half the molar amount of hydrochloric acid (0.005 to 0.025 mol/L). The mass of the amine solutions was 250 g. The measured pH corresponded to the pKa. The measurements were conducted at 20 and 120° C. The pH electrode used was the "Hamilton Polylite Plus 120" model, which is calibrated with pH 7 and pH 12 buffer solutions. The measurement was effected in a thermostated closed jacketed vessel with nitrogen blanketing.

| Amine | $pK_A$ at 20° C. | $pK_A$ at 120° C. | $\Delta pK_a$ (120 − 20° C.) |
|---|---|---|---|
| MDEA* | 8.7 | 7.0 | 1.7 |
| DATP⁺ | 10.7 | 8.1 | 2.6 |
| TAAol | 10.2 | 7.6 | 2.6 |

*comparative compound
⁺in the case of DATP, the first $pK_A$ was reported

It is expected that the great $pK_A$ differential for DATP and TAAol between absorption and desorption temperature will result in a comparatively small regeneration energy.

Example 2—Selectivity

A glass reactor with a thermostated jacket and stirrer (stirrer speed=200 rpm) was initially charged with about 200 mL of unladen aqueous absorbent (TAAol+MDEA: TAAol: 0.77 M; MDEA: 0.63 M; residual absorbent: 1.4 M). At the top of the glass cylinder, a glass condenser was attached, which was operated at 5° C. This prevented distortion of the test results by partial evaporation of the absorbent. To determine the absorption capacity, at ambient pressure and 40° C., 216 L (STP)/h of acid gas (1.0% by volume of $H_2S$, 10% by volume of $CO_2$ and 89% by volume of $N_2$) were passed through the absorption liquid via an immersed tube. Samples were taken from the glass reactor at regular time intervals and the loading of $CO_2$ and $H_2S$ was determined as follows:

The determination of $H_2S$ was effected by titration with silver nitrate solution. For this purpose, the sample to be analyzed was weighed into an aqueous solution together with about 2% by weight of sodium acetate and about 3% by weight of ammonia. Subsequently, the $H_2S$ content was determined by a potentiometric turning point titration by means of silver nitrate solution. At the turning point, the $H_2S$ is fully bound as $Ag_2S$. The $CO_2$ content was determined as total inorganic carbon (TOC-V Series Shimadzu).

The selectivity was calculated as $$\frac{\frac{mol(H_2S)}{mol(CO_2)} \text{ in the liquid phase}}{\frac{mol(H_2S)}{mol(CO_2)} \text{ in the gas phase}}$$

Figure 2:
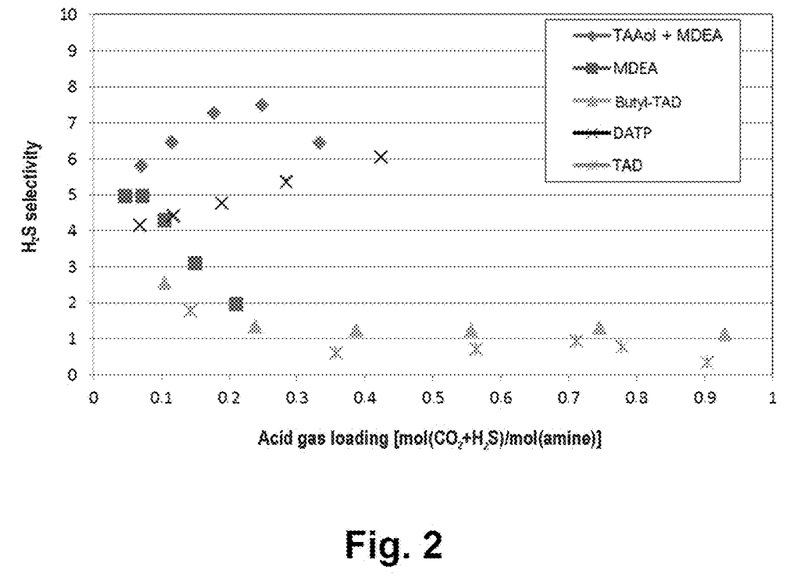
FIG. 2 shows the $H_2S$ selectivity of 4-butylamino-2,2,6,6-tetramethylpiperidine (butyl-TAD), 4-dimethylamino-2,2,6,6-tetramethylpiperidine (DATP), methyldiethanolamine (MDEA), 4-amino-2,2,6,6-tetramethylpiperidine (TAD), and a mixture of 4-hydroxy-2,2,6,6-tetramethylpiperidine and MDEA (TAAol+MDEA) and at various acid gas loadings.

The results are shown in FIG. 2. It is clear that the absorbent based on TAAol+MDEA and DATP has a higher selectivity than the comparative examples, especially at higher acid gas loadings.

Example 3—Loading and Stripping Experiment

A glass cylinder with a thermostated jacket was initially charged with about 100 mL of unladen absorbent (30% by weight). At the top of the glass cylinder, a glass condenser was attached, which was operated at 5° C. This prevented distortion of the test results by partial evaporation of the absorbent. To determine the absorption capacity, at ambient pressure and 40° C., 8 L (STP)/h of acid gas $H_2S$ or $CO_2$ were passed through the absorption liquid via a frit. Subsequently, the loading of $CO_2$ or $H_2S$ was determined as in example 2.

The laden solution was stripped by heating an identical apparatus setup to 80° C., introducing the laden absorbent and stripping it by means of an $N_2$ stream (8 L (STP)/h). After 60 min, a sample was taken and the $CO_2$ or $H_2S$ loading of the absorbent was determined as in example 2.

The difference in the loading at the end of the loading experiment and the loading at the end of the stripping experiment gives the respective cyclic capacity. The results are shown in table 1.

TABLE 1

| # | Absorbent Composition | $CO_2$ loading [m³ (STP)/t] after loading | $CO_2$ loading [m³ (STP)/t] after stripping | Cyclic $CO_2$ capacity [m³ (STP)/t] | $H_2S$ loading [m³ (STP)/t] after loading | $H_2S$ loading [m³ (STP)/t] after stripping | Cyclic $H_2S$ capacity [m³ (STP)/t] | $H_2S$:$CO_2$ loading capacity ratio |
|---|---|---|---|---|---|---|---|---|
| 3-1* | 30% by wt. of MDEA + 70% by wt. of water | 43.4 | 2.7 | 40.7 | 38.7 | 6.7 | 32.0 | 0.79 |
| 3-2 | 30% by wt. of DATP + 70% by wt. of water | 55.2 | 12.2 | 43.0 | 55.5 | 12.5 | 43.0 | 1.0 |
| 3-3 | 30% by wt. of DATP + 70% by wt. of ethylene glycol | 28.8 | 4.6 | 24.2 | 39.9 | 7.0 | 32.9 | 1.36 |
| 3-4 | 30% by wt. of DATP + 70% by wt. of triethylene glycol | 4.8 | 0.7 | 4.1 | 34.5 | 5.0 | 29.5 | 4.10 |

*comparative example

It is clear from the comparison of examples 3-1 and 3-2 that DATP has both a higher $CO_2$ loading capacity and a higher $H_2S$ loading capacity, and higher cyclic $CO_2$ and $H_2S$ capacities. An elevated $H_2S$:$CO_2$ loading capacity ratio is also apparent.

It is also clear that nonaqueous solvents result in reduced $CO_2$ and $H_2S$ loading capacity and lower cyclic $CO_2$ and $H_2S$ capacities, but cause a higher $H_2S$ selectivity.

Example 4—pH Gradient/Regeneration Energy

The temperature dependence of the pH of aqueous amine solutions or partly neutralized amine solutions was determined in the temperature range from 50° C. to 120° C. The Hamilton Polylite Plus 120 pH electrode was used, which is calibrated with pH 7 and pH 12 buffer solutions. A pressure apparatus with nitrogen blanketing was used, in which the pH can be measured up to 120° C.

Table 2 reports the pH (50° C.), the pH (120° C.) and the differential pH (50° C.)—pH (120° C.) for aqueous compositions. It is clear that there is a greater difference between the pH values at 50° C. and 120° C. in the examples in which the aqueous composition comprises 4-hydroxy-2,2,6,6-tetramethylpiperidine.

In a pilot plant, the heating energy introduced in the course of regeneration for a defined $H_2S$ concentration of the cleaned gas was examined for aqueous absorbents. The pilot plant corresponded to FIG. 1. In the absorber, a structured packing was used. The pressure was 60 bar. The packing height in the absorber was 3.2 m with a column diameter of 0.0531 m. In the desorber, a structured packing was used. The pressure was 1.8 bar. The packing height in the desorber was 6.0 m with a diameter of 0.085 m.

A gas mixture of 93% by volume of $N_2$, 5% by volume of $CO_2$ and 2% by volume of $H_2S$ was conducted into the absorber at a mass flow rate of 47 kg/h and a temperature of 40° C. In the absorber, the absorbent circulation rate was 60 kg/h. The temperature of the absorbent was 50° C. The regeneration energy was adjusted such that an $H_2S$ concentration of 5 ppm was attained in the cleaned gas. The results are shown in table 3.

TABLE 2

| Ex. | Aqueous composition | TAAol: MDEA** | pH (50° C.) | pH (120° C.) | pH (50° C.) − pH (120° C.) |
|---|---|---|---|---|---|
| 4-1* | 40% MDEA | — | 11.01 | 9.58 | 1.43 |
| 4-2* | 40% MDEA + 0.5% $H_3PO_4$ | — | 9.76 | 8.29 | 1.47 |
| 4-3 | 35% MDEA + 10% 4-hydroxy-2,2,6,6-tetramethylpiperidine + 0.4% $H_2SO_4$ | 0.22 | 10.23 | 8.62 | 1.61 |
| 4-4 | 35% MDEA + 10% 4-hydroxy-2,2,6,6-tetramethylpiperidine + 0.9% $H_2SO_4$ | 0.22 | 9.87 | 8.21 | 1.66 |
| 4-5 | 35% MDEA + 10% 4-hydroxy-2,2,6,6-tetramethylpiperidine + 1.2% $H_2SO_4$ | 0.22 | 9.68 | 8.03 | 1.65 |

*comparative example

**molar ratio of 4-hydroxy-2,2,6,6-tetramethylpiperidine to MDEA

TABLE 3

| Ex. | Aqueous composition | Relative regeneration energy** [%] |
|---|---|---|
| 4-6* | 40% MDEA | 100.0 |
| 4-7* | 40% MDEA + 0.5% $H_3PO_4$ | 73.3 |
| 4-8 | 35% MDEA + 10% 4-hydroxy-2,2,6,6-tetramethylpiperidine + 0.9% $H_2SO_4$ | 70.5 |
| 4-9 | 35% MDEA + 10% 4-hydroxy-2,2,6,6-tetramethylpiperidine + 1.2% $H_2SO_4$ | 64.6 |

*comparative example

**relative to example 4-7*

It is clear that the aqueous compositions comprising 4-hydroxy-2,2,6,6-tetramethylpiperidine have a lower regeneration energy requirement.

The invention claimed is:

1. A process for selectively removing hydrogen sulfide from a fluid stream comprising carbon dioxide and hydrogen sulfide, the method comprising contacting the fluid stream with an absorbent comprising an amine of formula (I):

wherein
$R^1$, $R^2$, $R^3$ and $R^4$ are methyl;
$R^5$ is $OR^{10}$; and $R^{10}$ is selected from hydrogen, $C_1$-$C_5$-alkyl and $C_2$-$C_5$-hydroxyalkyl;
to obtain a treated fluid stream and a laden absorbent, wherein the following expression is satisfied:

$$\frac{\frac{mol(H_2S)}{mol(CO_2)} \text{ in the laden absorbent at the bottom of the absorber}}{\frac{mol(H_2S)}{mol(CO_2)} \text{ in the fluid stream}} > 1.$$

2. The process according to claim 1, wherein the amine of the formula (I) is selected from the group consisting of:
4-hydroxy-2,2,6,6-tetramethylpiperidine,
4-ethoxy-2,2,6,6-tetramethylpiperidine,
4-propoxy-2,2,6,6-tetramethylpiperidine,
4-butoxy-2,2,6,6-tetramethylpiperidine,
4-(2'-hydroxyethoxy)-2,2,6,6-tetramethylpiperidine,
4-(3'-hydroxypropoxy)-2,2,6,6-tetramethylpiperidine and
4-(4'-hydroxybutoxy)-2,2,6,6-tetramethylpiperidine.

3. The process according to claim 1, wherein the absorbent is an aqueous solution.

4. The process according to claim 1, wherein the absorbent comprises at least one organic solvent.

5. The process according to claim 1, wherein the absorbent comprises an acid having a $pK_A$ of less than 6.

6. The process according to claim 1, wherein the absorbent comprises a tertiary amine or highly sterically hindered amine, wherein the highly sterically hindered amine comprises a tertiary carbon atom directly adjacent to a primary or secondary nitrogen atom.

7. The process according to claim 1, wherein a residual carbon dioxide content in the treated fluid stream is at least 0.5% by volume.

8. The process according to claim 1, wherein the laden absorbent is regenerated by at least one of the measures selected from the group consisting of heating, decompressing and stripping with an inert fluid.

* * * * *

UNITED STATES PATENT AND TRADEMARK OFFICE
CERTIFICATE OF CORRECTION

PATENT NO. : 10,493,398 B2
APPLICATION NO. : 15/764138
DATED : December 3, 2019
INVENTOR(S) : Thomas Ingram et al.

Page 1 of 1

It is certified that error appears in the above-identified patent and that said Letters Patent is hereby corrected as shown below:

In the Specification

In Column 5, Line 25, delete "4-(d i" and insert -- 4-(di --, therefor.

Signed and Sealed this
Thirtieth Day of June, 2020

Andrei Iancu
*Director of the United States Patent and Trademark Office*